US007600736B2

(12) United States Patent
Lee

(10) Patent No.: US 7,600,736 B2
(45) Date of Patent: Oct. 13, 2009

(54) LOCKABLE NOTEBOOK STAND

(75) Inventor: Miko Lee, Hsinchuang (TW)

(73) Assignee: ABA UFO International Corp., Hsin Chuang, Taipei Hsien (TW)

( * ) Notice: Subject to any disclaimer, the term of this patent is extended or adjusted under 35 U.S.C. 154(b) by 0 days.

(21) Appl. No.: 12/000,975

(22) Filed: Dec. 19, 2007

(65) Prior Publication Data

US 2009/0159769 A1 Jun. 25, 2009

(51) Int. Cl.
*F16M 1/00* (2006.01)
*F16M 3/00* (2006.01)
*F16M 5/00* (2006.01)

(52) U.S. Cl. .................. 248/551; 248/346.01; 248/918

(58) Field of Classification Search ................. 248/918, 248/551, 553, 346.01, 500, 505, 506, 510; 70/58

See application file for complete search history.

(56) References Cited

U.S. PATENT DOCUMENTS 5,595,074 A * 1/1997 Munro .......................... 70/58
5,642,634 A * 7/1997 Perry ............................ 70/18
RE35,677 E * 12/1997 O'Neill ...................... 248/551
5,709,110 A * 1/1998 Greenfield et al. ............. 70/58
5,927,108 A * 7/1999 Pierce ........................... 70/19
6,166,910 A * 12/2000 Ronberg et al. ............. 361/724
6,237,375 B1 * 5/2001 Wymer .......................... 70/14
7,174,752 B2 * 2/2007 Galant ........................... 70/58
7,443,665 B2 * 10/2008 Allen ......................... 361/683

* cited by examiner

*Primary Examiner*—Amy J. Sterling
(74) *Attorney, Agent, or Firm*—Bacon & Thomas, PLLC

(57) ABSTRACT

A lockable notebook stand securely holds a notebook computer in position and is available for all kinds of notebook computer without any redesigning or retrofitting of the notebook computer or the lockable notebook stand. The lockable notebook stand has a stationary base, a sliding base and two clamps. The stationary base has at least one rod. The sliding base has at least one rod mount and a lock. The rod mount is formed through the sliding base aligns with and is slidably mounted around the rod of the stationary base. The lock is formed through the sliding base, corresponds to the rod mount and locks the rod. The clamps are formed respectively on the top of the stationary base and the sliding base and selective clamp and lock the notebook computer as the sliding base slides toward the stationary base.

7 Claims, 7 Drawing Sheets

LOCKABLE NOTEBOOK STAND

BACKGROUND OF THE INVENTION

1. Field of the Invention

The present invention relates to a locking device, and more particularly to a lockable notebook stand for locking a notebook computer in position for burglarproof use.

2. Description of Related Art

Notebook computers are widely used in people's life because they are thin, small and light so allow people to carry and use notebook computers everywhere. However, being highly portable also means notebooks are easily stolen.

To prevent theft, notebook computer locks are provided for locking notebook computers to an immobile facility. A conventional notebook computer lock comprises a body and a cable. The body is mounted securely in a notebook computer and the body has locking components mounted therein. The cable has two ends, one end is connected securely to the body and then locked by the locking components of the body, the other end is looped around an immobile facility such as a desk, wall, or the like. Therefore, the notebook computer is secured to the immobile facility to provide burglarproofing.

However, since the conventional notebook computer lock is mounted in the notebook computer, the notebook computer must be redesigned to have enough space to mount the body therein, and raising a volume of the notebook computer. Moreover, unauthorized persons can still break and detach the body from the notebook computer and steal the notebook computer.

To overcome the shortcomings, the present invention provides a lockable notebook stand for a notebook computer to obviate or mitigate the aforementioned problems.

SUMMARY OF THE INVENTION

The main objective of the present invention is to provide a lockable notebook stand that securely holds a notebook computer in position and is applicable to a variety of notebook computers having various dimensions without requiring any redesign or retrofitting of the notebook computer or the lockable notebook stand.

To achieve the objective, the lockable notebook stand in accordance with the present invention has a stationary base, a sliding base and two clamps.

The stationary base has at least one rod being formed transversely on an inner end of the stationary base.

The sliding base has at least one rod mount and a lock. The rod mount is transversely formed through the sliding base, aligns with and is slidably mounted around the rod of the stationary base. The lock is formed through the sliding base, corresponds to the rod mount and locks the rod.

The clamps are formed respectively on the top of the stationary base and the sliding base and selectively clamp and lock the notebook computer as the sliding base slides toward the stationary base.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
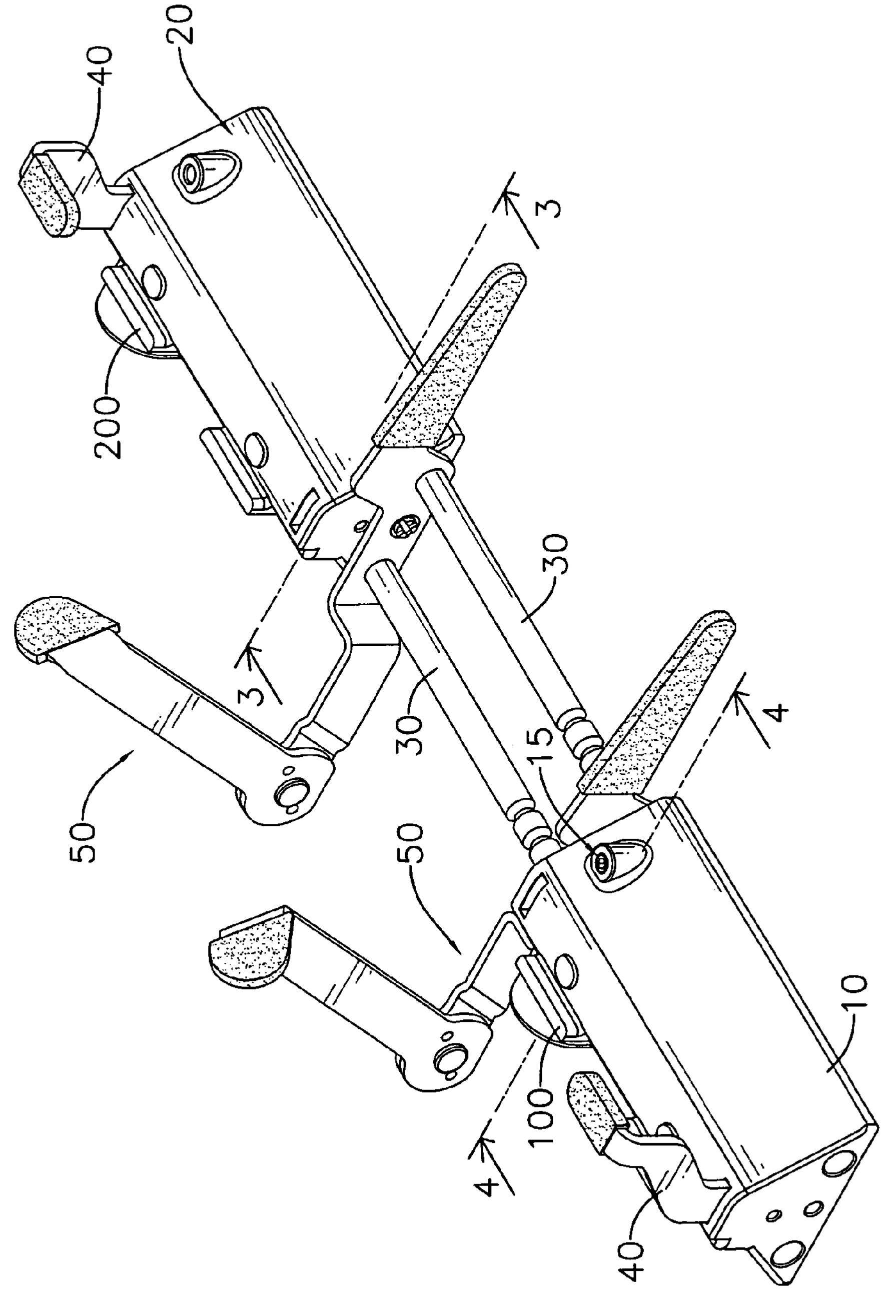
FIG. 1 is a perspective view of the lockable notebook stand for a notebook computer in accordance with the present invention.
Figure 5:
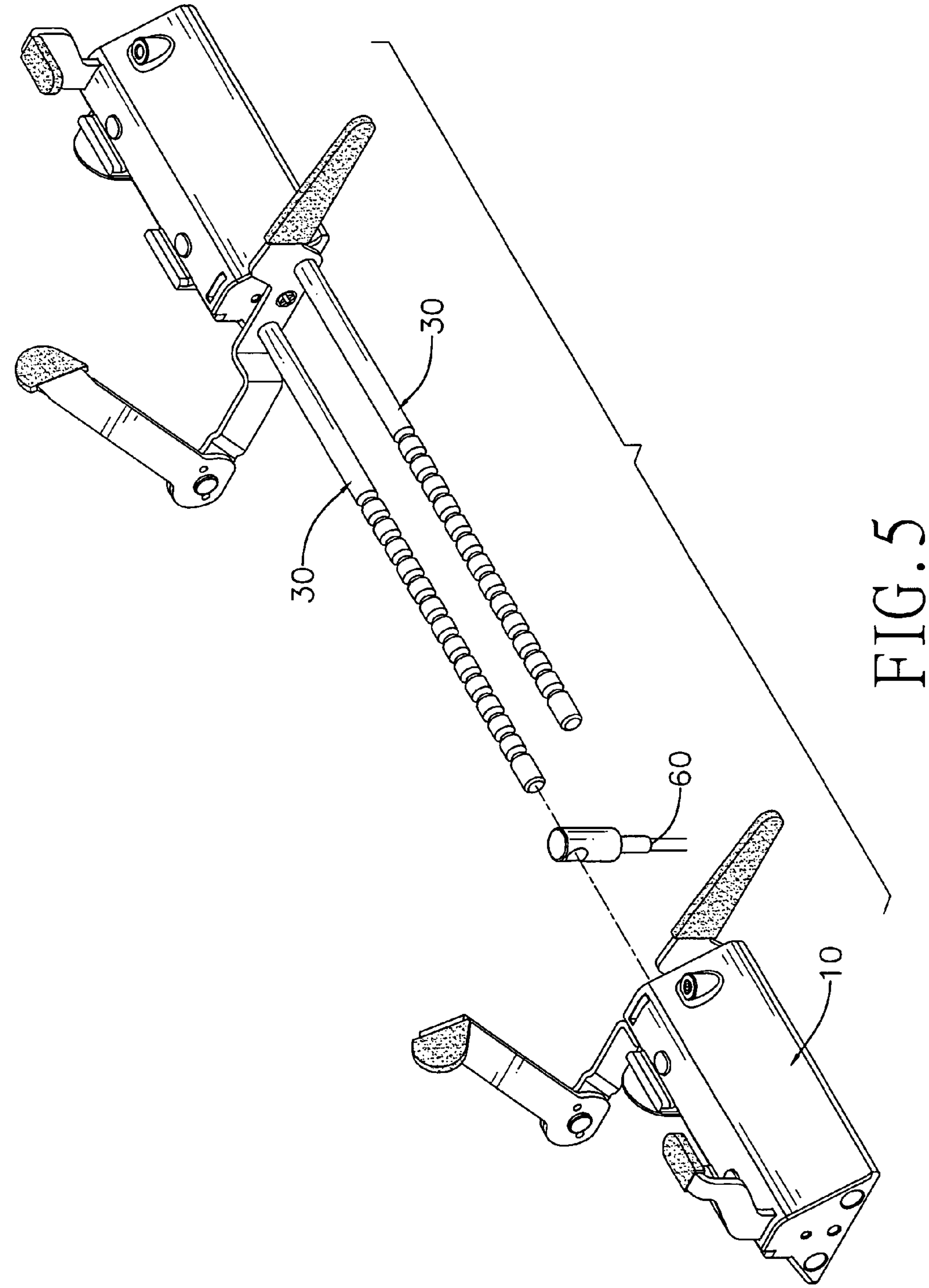
FIG. 5 is a partially exploded, operational, perspective view of the lockable notebook stand in FIG. 1.

With reference to FIGS. 1 and 5, a lockable notebook stand in accordance with the present invention is attached to an immovable facility such as a desk, wall, floor or the like and has a stationary base (20), a sliding base (10), two clamps (40), two optional supporting brackets (50) and an optional fixing cable (60).

Figure 2:
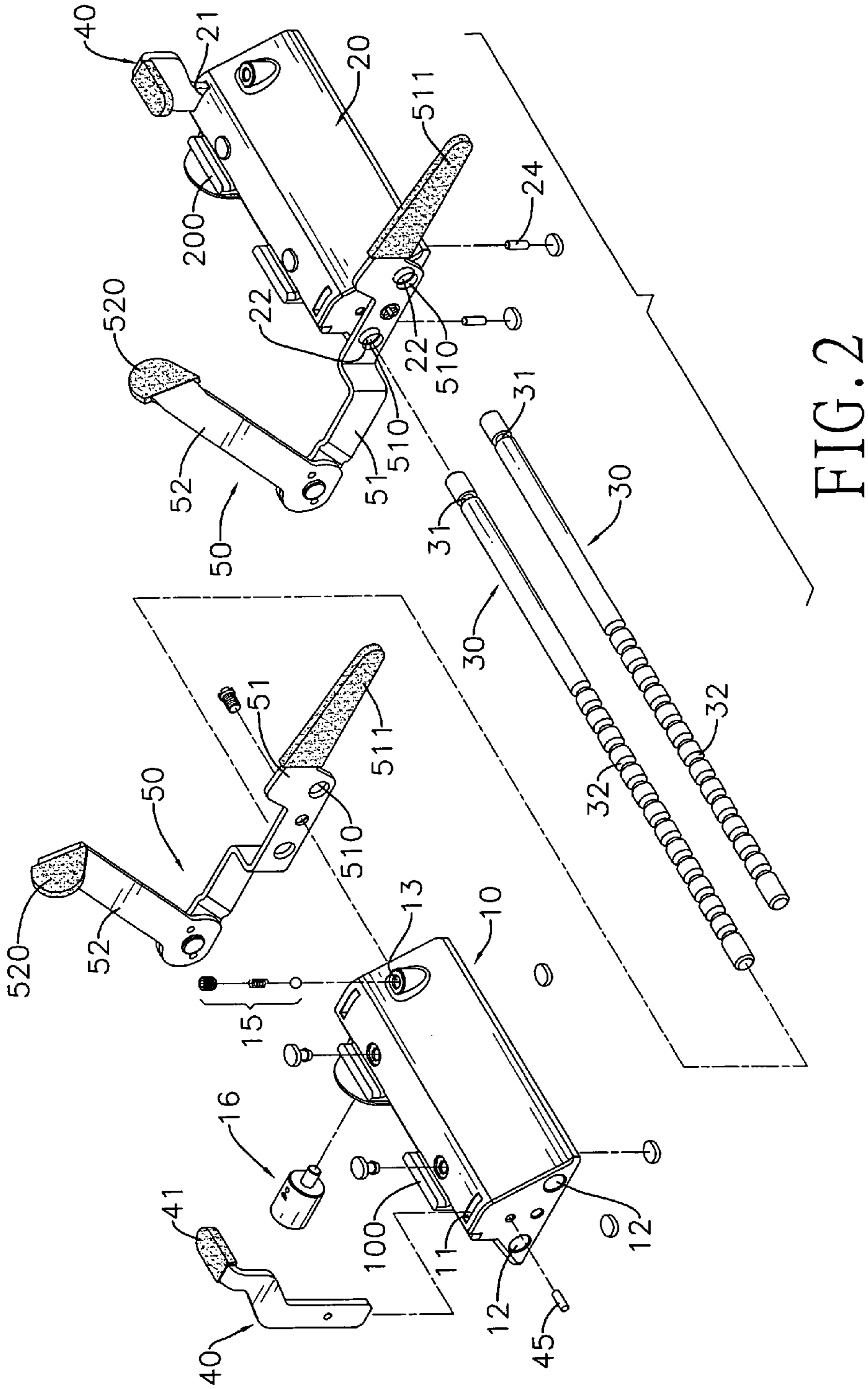
FIG. 2 is a partially exploded perspective view of the lockable notebook stand in FIG. 1.
Figure 3:
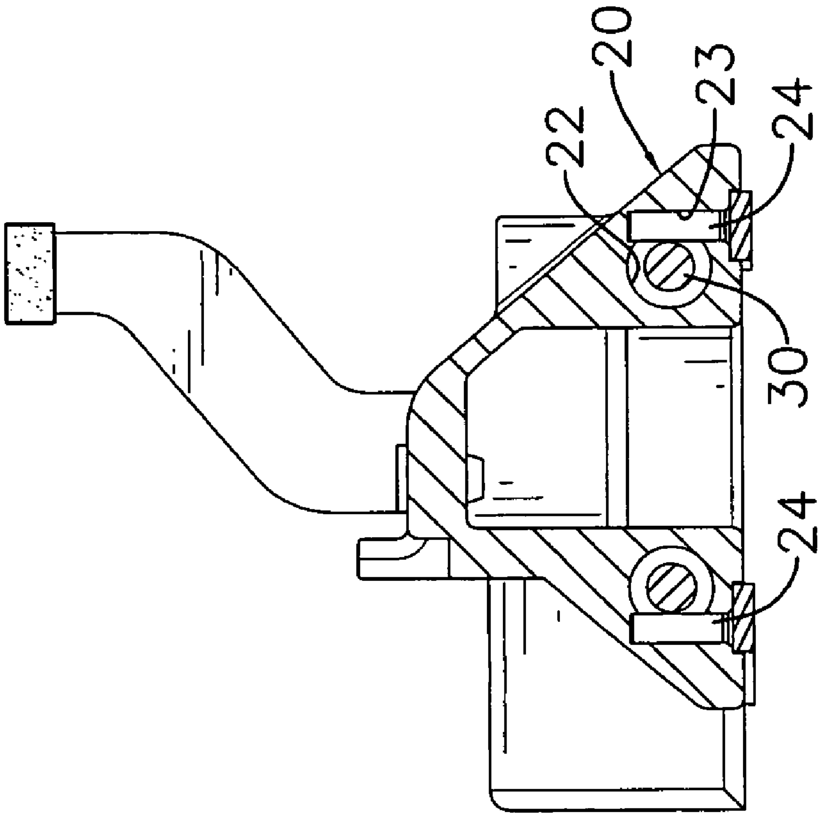
FIG. 3 is a cross sectional side view of the lockable notebook stand in FIG. 1.

With further reference to FIGS. 2 and 3, the stationary base (20) has a top, a bottom, an inner end, an outer end, multiple optional stops (200), an optional mounting slot (21), at least one optional mounting hole (22) and two rods (30). The stops (200) are formed on and protrude from the top of the stationary base (20), may be flat and prevent a notebook from sliding on the top of the stationary base (20). The mounting slot (21) is formed on the top, near the outer end of the stationary base (20). The mounting holes (22) are formed in the inner end of the stationary base (20). Each rod (30) is parallelly mounted longitudinally on the inner end of the stationary base (20), may be in one of the mounting holes (22) and has an outer surface, a proximal end, a distal end, multiple distal notches (32), an optional proximal notch (31) and an optional fastener (24). The distal notches (32) are separately formed around the surface of the rod (30) at the distal end. The proximal notch (31) is formed around the outer surface of the rod at the proximal end and is mounted in a corresponding mounting hole (22). The fastener (24) is mounted perpendicularly through the bottom of the stationary base (20), and in the proximal notch (31) of a corresponding rod (30) to hold the corresponding rod (30) in the stationary base (20).

The sliding base (10) has a top, an inner end, an outer end, multiple optional stops (100), an optional mounting slot (11), two rod mounts (12), an optional detent hole (13), an optional detent assembly (15), a lock mount (14) and a lock (16). The inner end of the sliding base (10) is opposite to the inner end of the stationary base (20).

The stops (100) are formed on and protrude from the top of the sliding base (10) correspond to the stops (200) of the stationary base (20), may be flat and prevent the notebook from sliding on the top of the stationary base (20).

The mounting slot (11) is formed on the top, near the outer end of the sliding base (10).

Figure 4:
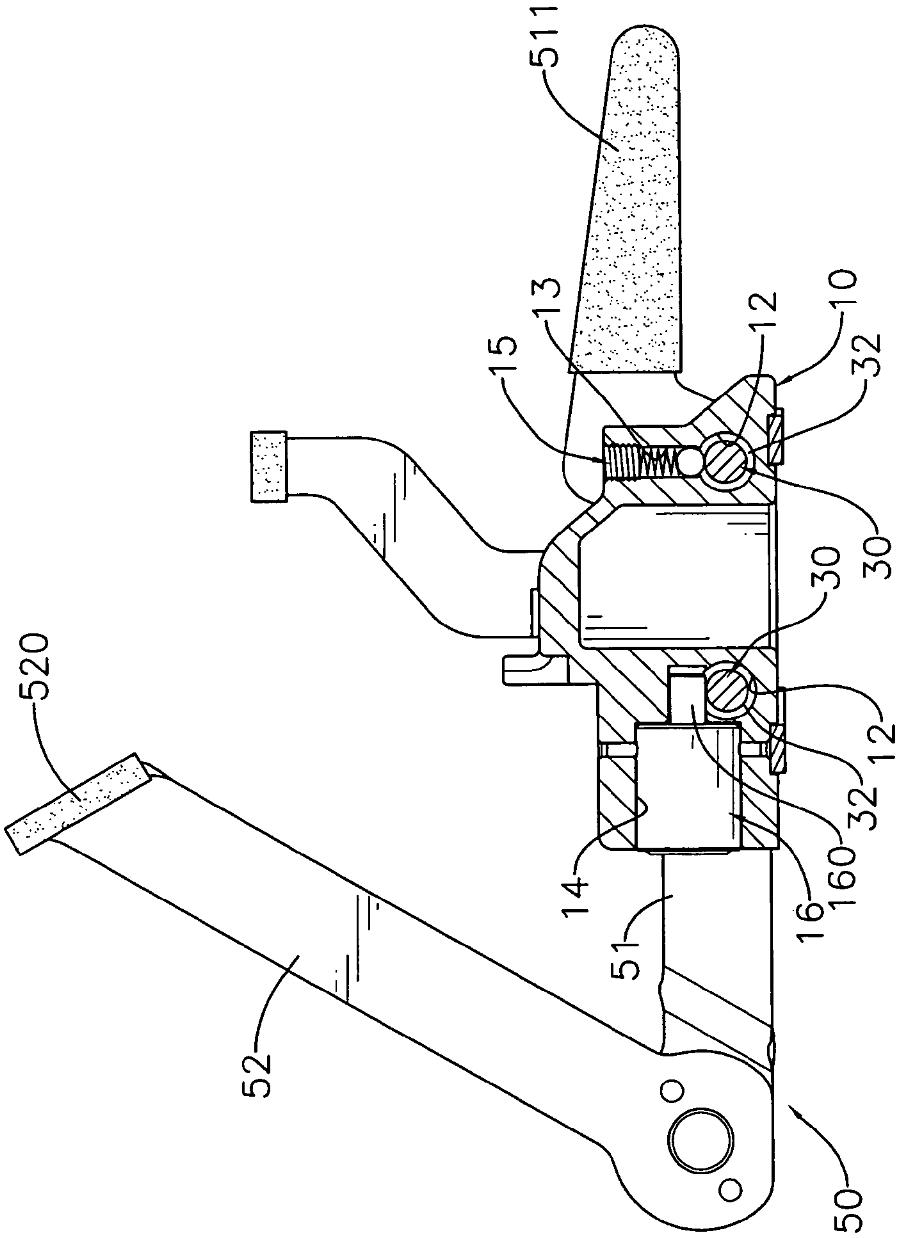
FIG. 4 is an enlarged side view in partial section of the lockable notebook stand in FIG. 1.

With further reference to FIG. 4, each rod mount (12) is formed longitudinally through the sliding base (10), aligns with a corresponding rod (30) of the stationary base (20) and is mounted slidably around the corresponding rod (30) to make a distance between the stationary and sliding bases (10, 20) adjustable.

The detent hole (13) is formed on the top of the sliding base (10), communicates with one of the rod mounts (12) and has an opening. The detent assembly (15) comprises a cap, a ball and a resilient element. The ball is mounted in the detent hole (13). The resilient element is mounted in the detent hole (13) and presses the ball into the detent hole (13) to engage one of the distal notches (32) of one rod (30). The cap is mounted securely over the opening of the detent hole (13).

The lock mount (14) is formed transversely in the sliding base (10) and communicates with one rod mount (12). The lock (16) may be a cylinder lock, is mounted securely in the lock mount (14) of the sliding base (10) and has a lock bolt selectively protruding into a corresponding distal notch (32) of the rod (30) to lock the sliding base (10) in position relative to the stationary base (20). The lock bolt is aligned with the distal notch (32) by the detent assembly (15).

The clamps (40) are transversely attached respectively to the tops of the stationary and sliding bases (10, 20), may be mounted respectively in the mounting slots (11,21), may be mounted slidably in the mounting slots (11, 21) of the stationary base (20) and the sliding base (10) and each clamp (40) has a retaining end (41) formed on and protruding from the clamp (40) parallelly with the top and extending toward the inner end of a corresponding base (10, 20) and having an optional resilient sheath mounted on the retaining end (41) of the clamp (40).

The supporting brackets (50) are mounted separately on the rods (30) and respectively connected securely to the stationary base (20) and the sliding base (10) and each supporting bracket (50) comprises a base support (51) and a cover support (52).

The base support (51) protrudes transversely from the base (10, 20) to support a base of a notebook and has a supporting end, a pivoting end, two through holes (510) and a resilient sheath (511). The through holes (510) are formed through the base support (51), correspond to and are mounted respectively around the rods (30). The resilient sheath (511) is mounted around the supporting end of the base support (51).

The cover support (52) is mounted securely, may be mounted rotatably on the pivoting end of the base support (51) and has a supporting end, a tab (520) and a resilient sheath. The tab (520) is formed on and protrudes transversely from the cover support (52). The resilient sheath of the cover support (52) is mounted over the tab (520) of the cover support (52).

The fixing cable (60) has two ends and at least one head. The head is mounted securely on one end and has a securing hole formed therethrough and is mounted around one of the rods (30). The other end is attached to the immovable facility, or may comprises a head having a securing hole formed therethrough and be looped around an immovable facility and mounted around one of the rods (30).

Figure 6:
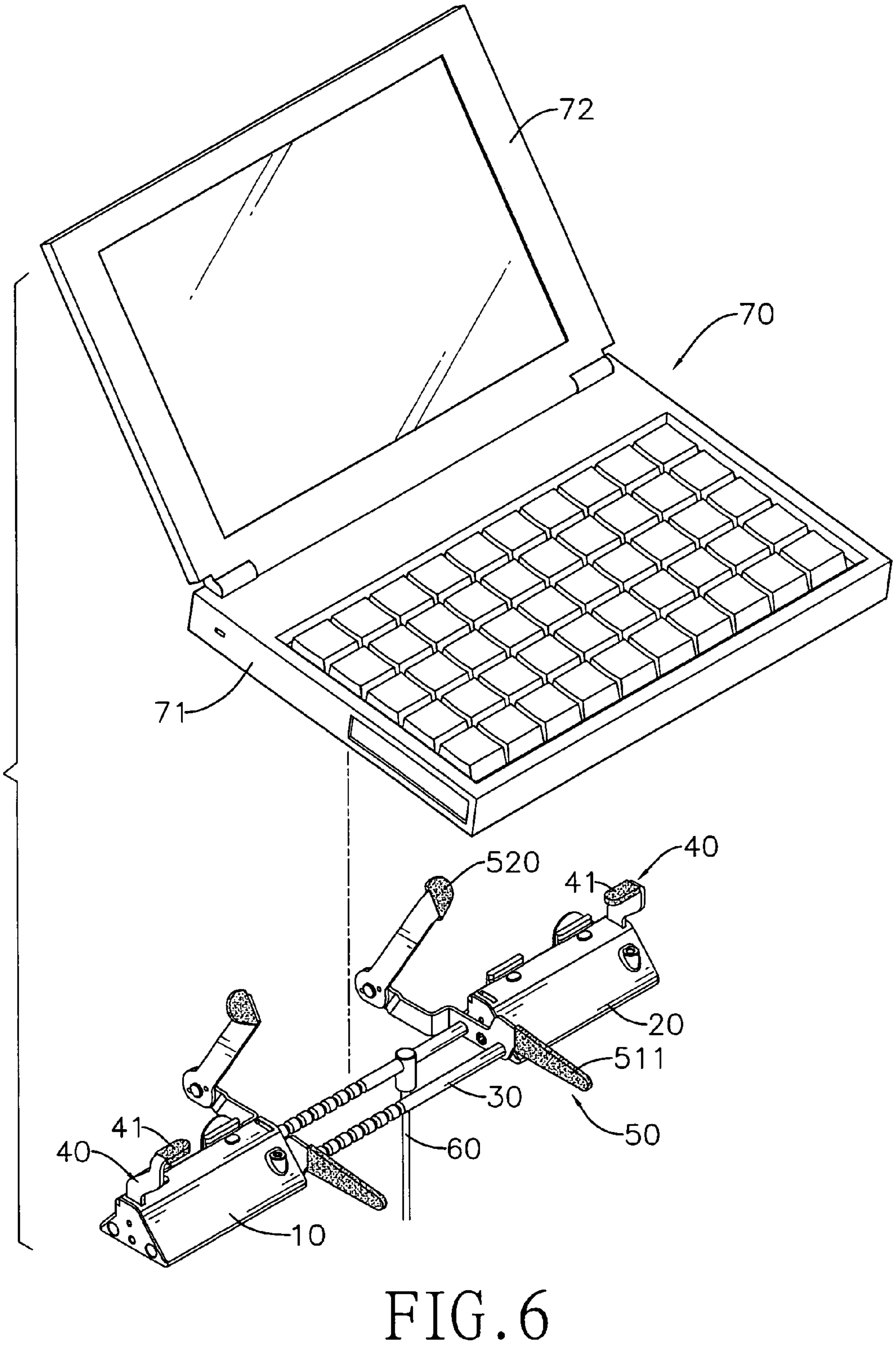
FIG. 6 is an operational exploded perspective view of the lockable notebook stand in FIG. 1, shown being mounted on a notebook computer.
Figure 7:
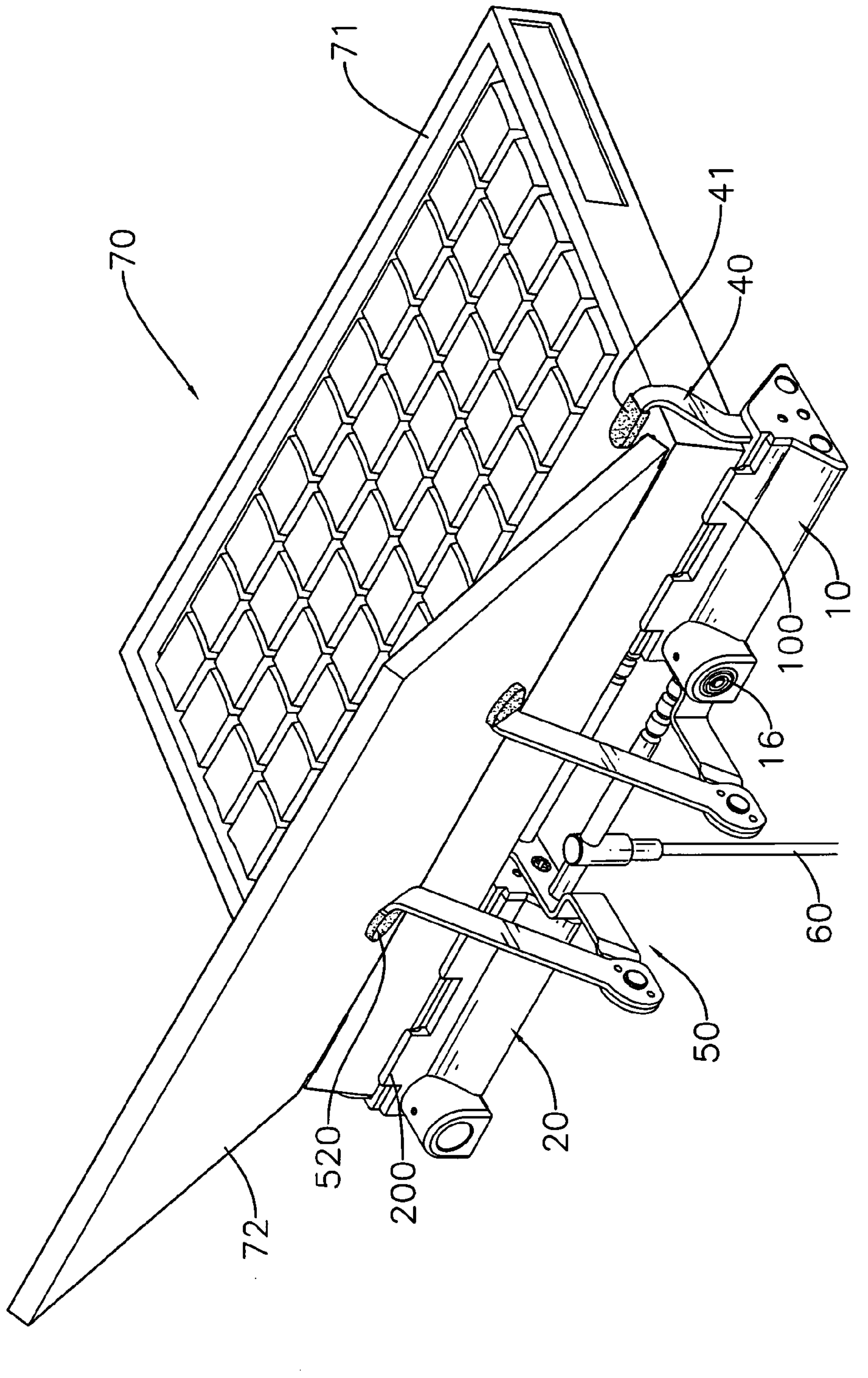
FIG. 7 is an operational perspective view of the lockable notebook stand in FIG. 1, shown mounted on the notebook computer.

With further reference to FIGS. 6 and 7, a notebook computer (70) having a base (71) and a cover (72) can be mounted detachably on the top of the stationary and sliding bases (10, 20), which are then slid together and locked and between the clamps (40) that may be moved down to abut the base (71) of the notebook (70) to prevent lifting up of the notebook (70). The base (71) of the notebook (70) is supported by the base supports (51) of the supporting brackets (50) and the base (71) of the notebook (70) has a pivoting end abutting the stops (100,200) of the stationary and sliding bases (10, 20) to prevent the notebook (70) from being slid backward out of the clamps (40). The cover (72) is inclined relative to the base (71) of the notebook (70) for use and selectively abuts the tabs (520) of the cover supports (52) to limit rotation of the cover (72) relative to the base (71) and prevent the notebook (70) being slid forwards out of the clamps (40). Therefore, with the lockable notebook stand attached securely to the immovable facility, may be using the cable (60), the notebook (70) is secured and burglarproofed. Moreover, the bases (10, 20), clamps (40) and brackets (50) of the lockable notebook stand are adjustable to fit a wide variety of notebooks without requiring redesign or retrofit of the notebooks or the lockable notebook stand.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A lockable notebook stand being fixed to an immovable facility and comprising
- a stationary base having
- a top;
- a bottom;
- an inner end;
- an outer end; and
- at least one rod being mounted longitudinally on the inner end of the stationary base and each one of the at least one rod having
- an outer surface;
- a distal end; and
- multiple distal notches separately formed around the surface of the rod at the distal end;
- a sliding base having
- a top;
- an inner end being opposite to the inner end of the stationary base
- an outer end;
- at least one rod mount being formed longitudinally through the sliding base, respectively aligning with and being mounted around the at least one rod of the stationary base;
- a lock mount being formed transversely in the sliding base and communicating with one of the at least one rod mount; and
- a lock being mounted securely in the lock mount and having a lock bolt selectively protruding into one of the distal notches of one of the at least one rod;
- a detent hole being formed on the top of the sliding base and communicating with one of the at least one rod mount and having an opening; and
- a detent assembly comprising
- a ball being mounted in the detent hole;
- a resilient element being mounted in the detent hole and pressing the ball into the detent hole to engage one of the distal notches of one of the at least one rod; and
- a cap being mounted securely over the opening of the detent hole; and
- two clamps being attached respectively on the top of the stationary base and the sliding base and each clamp having a retaining end being formed on and protruding from the clamp parallelly with the top and extending toward the inner end of a corresponding base.

2. The lockable notebook stand as claimed in claim 1, wherein
- the stationary base further has multiple stops being formed on and protruding from the top of the stationary base; and
- the sliding base further has multiple stops being formed on and protruding from the top of the sliding base and corresponding to the stops of the stationary base.

3. The lockable notebook stand as claimed in claim 1, wherein the stationary base has two rods being parallelly mounted longitudinally on the inner end of the stationary base; and the sliding base has two rod mounts respectively corresponding to the rods;

the lock corresponds to one of the rods; and the ball of the detent assembly corresponds to the other rod.

4. The lockable notebook stand as claimed in claim 3 further comprising two supporting brackets being mounted separately on the rods and respectively connected securely to the stationary and sliding bases and each supporting bracket comprising a base support protruding transversely from a corresponding one of the stationary and sliding bases and having a supporting end, a pivoting end and at least one through hole being formed through the base support, corresponding to and being mounted respectively around the rods; and a cover support being mounted on the pivoting end of the base support and having a supporting end;

a tab being formed on and protruding transversely from the cover support; and a resilient sheath being mounted over the tab of the cover support.

5. The lockable notebook stand as claimed in claim 1, wherein the stationary base further has at least one mounting hole being formed on the inner end of the stationary base; and each one of the at least one rod further has a proximal end;

a proximal notch being formed around the outer surface of the rod at the proximal end and being mounted in a corresponding mounting hole of the stationary base; and a fastener being mounted perpendicularly through the bottom of the stationary base and in the proximal notch of the rod to hold the rod in the stationary base.

6. The lockable notebook stand as claimed in claim 1, wherein the stationary base further has a mounting slot being formed on the top, near the outer end of the stationary base; and the sliding base further has a mounting slot being formed on the top, near the outer end of the sliding base; and the clamps are mounted respectively in the mounting slots of the stationary base and the sliding base.

7. A lockable notebook stand being fixed to an immovable facility and comprising a stationary base having multiple stops being formed on and protruding from the top of the stationary base;

two mounting holes being formed on the inner end of the stationary base;

two rods being parallelly mounted longitudinally in the mounting holes in the inner end of the stationary base and each rod having a proximal end;

a proximal notch being formed around the outer surface of the rod at the proximal end and being mounted in one of the mounting holes of the stationary base;

a fastener being mounted perpendicularly through the bottom of the stationary base and in the proximal notch of the rod to hold the rod in the stationary base; and a mounting slot being formed on the top, near the outer end of the stationary base;

a sliding base having a mounting slot being formed on the top, near the outer end of the sliding base;

two rod mounts respectively corresponding to the rods;

multiple stops being formed on and protruding from the top of the sliding base and corresponding to the stops of the stationary base;

a detent hole being formed on the top of the sliding base and communicating with one of the rod mounts and having an opening; and a detent assembly comprising a ball being mounted in the detent hole;

a resilient element being mounted in the detent hole and pressing the ball into the detent hole to engage one of the distal notches of one of the rod; and a cap being mounted securely over the opening of the detent hole;

wherein the lock corresponds to one of the rods; and the ball of the detent assembly corresponds to the other rod;

two supporting brackets being mounted separately on the rods and respectively connected securely to the stationary and sliding bases and each supporting bracket comprising a base support protruding transversely from a corresponding one of the stationary and sliding bases and having a supporting end, a pivoting end and two through holes being formed through the base support, corresponding to and being mounted respectively around the rods; and a cover support being mounted securely on the pivoting end of the base support and having a supporting end;

a tab being formed on and protruding transversely from the cover support; and a resilient sheath being mounted over the tab of the cover support; and the clamps are respectively mounted securely in the mounting slots of the stationary base and the sliding base.

* * * * *